US008849651B2

(12) United States Patent
Selegey et al.

(10) Patent No.: US 8,849,651 B2
(45) Date of Patent: *Sep. 30, 2014

(54) METHOD AND SYSTEM FOR NATURAL LANGUAGE DICTIONARY GENERATION

(71) Applicant: ABBYY InfoPoisk LLC, Moscow (RU)

(72) Inventors: Vladimir Selegey, Moscow (RU); Alexey Marachim, Moscow (RU)

(73) Assignee: ABBYY InfoPoisk LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,814

(22) Filed: Dec. 21, 2012

(65) Prior Publication Data

US 2013/0110504 A1 May 2, 2013

Related U.S. Application Data

(63) Continuation of application No. 11/769,478, filed on Jun. 27, 2007.

(51) Int. Cl.
*G06F 17/27* (2006.01)
*G06F 17/28* (2006.01)

(52) U.S. Cl.
CPC ............ *G06F 17/28* (2013.01); *G06F 17/2755* (2013.01); *G06F 17/2735* (2013.01)
USPC .......................................................... 704/9

(58) Field of Classification Search
CPC .............. G06F 17/30684; G06F 17/28; G06F 17/2755; G06F 17/2735
USPC .......................................................... 704/9
See application file for complete search history.

(56) References Cited

U.S. PATENT DOCUMENTS

| 5,251,129 | A | 10/1993 | Jacobs et al. |
| 5,323,316 | A | 6/1994 | Kadashevich et al. |
| 5,521,816 | A | 5/1996 | Roche et al. |
| 5,559,692 | A | 9/1996 | Telingator et al. |
| 5,559,693 | A * | 9/1996 | Anick et al. ...................... 704/9 |
| 5,724,594 | A | 3/1998 | Pentheroudakis |
| 5,794,177 | A | 8/1998 | Carus et al. |
| 6,076,051 | A | 6/2000 | Messerly et al. |
| 6,081,774 | A | 6/2000 | de Hita et al. |
| 6,192,333 | B1 | 2/2001 | Pentheroudakis |
| 6,246,977 | B1 | 6/2001 | Messerly et al. |
| 6,405,161 | B1 | 6/2002 | Goldsmith |
| 6,424,983 | B1 | 7/2002 | Schabes |
| 6,442,524 | B1 * | 8/2002 | Ecker et al. ................... 704/277 |
| 7,072,827 | B1 | 7/2006 | Carmel et al. |
| 7,120,582 | B1 | 10/2006 | Young et al. |

(Continued)

FOREIGN PATENT DOCUMENTS

EP 2400400 A1 12/2001

*Primary Examiner* — Jakieda Jackson
(74) *Attorney, Agent, or Firm* — LeighAnn Weiland; Aditya Krishnan; Veronica Weinstein

(57) ABSTRACT

A method and computer system for analyzing a text corpus in a natural language is provided. An initial morphological description having word inflection rules for various groups of words in the natural language is created by a linguist. A plurality of text corpuses are analyzed to obtain information on the occurrence of a plurality of word forms for each word token in each text corpus. A morphological dictionary which contains information about each base form and word inflection rules for each word token with verified hypothesis is generated.

18 Claims, 3 Drawing Sheets

(56) References Cited

U.S. PATENT DOCUMENTS

| | | |
|---|---|---|
| 7,158,930 B2 | 1/2007 | Pentheroudakis |
| 7,672,831 B2 | 3/2010 | Todhunter et al. |
| 7,698,131 B2 * | 4/2010 | Bennett .................. 704/215 |
| 8,271,453 B1 | 9/2012 | Pasca et al. |
| 8,577,907 B1 | 11/2013 | Singhal et al. |
| 2004/0034520 A1 * | 2/2004 | Langkilde-Geary et al. ..... 704/1 |
| 2004/0107088 A1 * | 6/2004 | Budzinski ................ 704/10 |
| 2006/0200336 A1 | 9/2006 | Cipollone et al. |
| 2006/0200337 A1 | 9/2006 | Cipollone et al. |
| 2006/0200338 A1 | 9/2006 | Cipollone et al. |
| 2010/0195909 A1 * | 8/2010 | Wasson et al. ............... 382/176 |
| 2012/0030226 A1 | 2/2012 | Holt et al. |
| 2012/0203777 A1 | 8/2012 | Laroco, Jr. et al. |

* cited by examiner

METHOD AND SYSTEM FOR NATURAL LANGUAGE DICTIONARY GENERATION

CROSS-REFERENCE TO RELATED APPLICATIONS

This application is a continuation of co-pending U.S. patent application Ser. No. 11/769,478 filed on 27 Jun. 2007 titled "Method and System for Natural Language Dictionary Generation."

BACKGROUND OF THE INVENTION

1. Field of the Invention

Embodiments of the invention generally relate to the field of natural language processing and may have various applications in such areas as electronic dictionaries, syntactic analysis, automated abstracting, machine translation, natural language processing, control systems, information search (including on the Internet), data retrieval, computer-aided learning, spelling check system, semantic Web, computer-aided learning, expert systems, speech recognition/synthesis and others.

2. Description of the Related Art

The ability to understand, speak, and write one or more languages is an integral part of human development to interact and communicate within a society. Various language analysis approaches have been used to dissect a given language, analyze its linguistic structure in order to understand the meanings of a word, a sentence in the given language, extract information from the word, the sentence, and, if necessary, translate into another language or synthesize into another sentence, which expresses the same semantic meaning in some natural or artificial language.

Complex natural language texts and constructs can be analyzed and translated from one language into another. Most natural language processing systems may involve the use of electronic dictionaries, syntactic analysis, automated abstracting, machine translation, information search, etc., and in all of these applications, a linguistic morphological component is required. This linguistic morphological component may contain, among other things, a morphological model (e.g., word inflexion rules and word formation rules) and a morphological dictionary.

Except for isolated languages (e.g., Chinese, etc.), morphological structures of most natural languages with word formation are usually available, whereas the realization of a morphological model and the use of such a morphological model to construct a morphological dictionary may vary. Known morphological models are oversimplified and differ in the degree of accuracy and the completeness of their morphological descriptions, and prior morphological dictionaries are usually not comprehensive (not exhaustive).

For example, some morphological models may concern only possible word endings (e.g., affixes, suffixes, etc) in a language and may not include any inflexion rules at all. Such morphological models can only be used in data retrieval or searching systems without a need for an exhaustive morphological dictionary. These morphological models, however, often results in many errors, wrong words and wrong word forms during language analysis. Such morphological models generally can not work for languages with internal inflexion or alternation. When a morphological dictionary is considered, prior morphological dictionaries often do not concern all possible inflexion rules or word endings. This is partially due to the fact that creating a morphological dictionary that keeps all possible word forms is a huge task and often time the morphological dictionary is extremely inefficient in real-time language analysis.

Accordingly, there exists a need for a method and system for creating an effective morphological model and generating natural language dictionary.

SUMMARY OF THE INVENTION

The invention generally relates to methods, computer-readable media, devices and computer systems for analyzing a text corpus in a natural language and generating a morphological dictionary for the natural language. An initial morphological description having word inflection rules for various groups of words in the natural language can be created by a linguist. In addition, these morphological descriptions, including paradigm rules, inflection rules, word formation rules, and a grammatical system of the natural language, and other direct and reverse rules, etc., are used to generate and verify hypotheses about a part of speech and word formation paradigm of each word token in a text corpus. A morphological dictionary is generated and may include a word list with grammatical information and verified morphological paradigms.

In one embodiment, a method of analyzing a text corpus in a natural language includes identifying each word token in the text corpus, applying one or more paradigm rules to each word token in the text corpus, and generating one or more hypotheses for base forms of each word token. The method also includes searching for other word forms corresponding to each base form of each word token and verifying each hypothesis of the one or more hypotheses for each base form to identify verified hypothesis. For each verified hypothesis, grammatical values and inflection paradigms are added to each base form of the word token and information about the morphological descriptions of each word token can be obtained.

In another embodiment, a method of generating a morphological dictionary for a natural language includes creating by a linguist an initial morphological description having word inflection rules for groups of words in the natural language and analyzing a plurality of text corpuses in the natural language to obtain information on the morphological descriptions for each word token with verified hypothesis in each text corpus. Each word token in each text corpus of the natural language is identified and verified hypothesis for each base form of each word token can be obtained by applying one or more paradigm rules to each word token in each text corpus, generating one or more hypotheses for base forms of each word token, searching for other word forms corresponding to each base form of each word token, and verifying each hypothesis of the one or more hypotheses for each base form. Grammatical values and inflection paradigms are added to each base form of each word token for each verified hypothesis. The base form of each word token with the morphological descriptions for each verified hypothesis is added to the morphological dictionary of the natural language.

In another embodiment, a computer readable medium having instructions for causing a computing system to carry out steps for analyzing a text corpus in a natural language is provided. The steps includes identifying each word token in the text corpus, applying one or more paradigm rules to each word token in the text corpus, generating one or more hypotheses for base forms of each word token, searching for other word forms corresponding to each base form of each word token, verifying each hypothesis of the one or more hypotheses for each base form to identify verified hypothesis, and adding grammatical values and inflection paradigms to each base form of each word token for each verified hypothesis, and obtaining information on its morphological descriptions for each word token with verified hypothesis.

In another embodiment, a computer readable medium having instructions for causing a computing system to carry out steps for of generating a morphological dictionary for a natural language is provided. The computer readable medium includes instructions for the computer system to perform steps including analyzing a plurality of text corpuses in the natural language and adding a base form for each word token with the morphological descriptions for each verified hypothesis in each text corpus to generate the morphological dictionary. The morphological descriptions for each word token with verified hypothesis are obtained through steps including identifying each word token in each text corpus of the natural language, applying one or more paradigm rules to each word token in each text corpus, generating one or more hypotheses for base forms of each word token, searching for other word forms corresponding to each base form of each word token, verifying each hypothesis of the one or more hypotheses for each base form to identify verified hypothesis, adding grammatical values and inflection paradigms to each base form of each word token for each verified hypothesis and obtaining information on its morphological descriptions for each word token with verified hypothesis.

In still another embodiment, a computer system adapted to analyze a text corpus in a natural language and/or generate a morphological dictionary for the natural language is provided.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide methods, computer-readable media, and computer systems configured to analyze a text corpus in a natural language and generate a morphological dictionary for the natural language. A morphological dictionary of a natural language may include a set of words taken in their base forms and supplied with, for example, part-of-speech labels and inflection models, etc., which may be verified on a large corpus of texts in the language.

According to one embodiment of the invention, an initial morphological description in the natural language can be created by a linguist. This initial morphological description may include word inflection rules for various groups of words, such as paradigm rules, word formation rules, and the grammatical system of the natural language, etc. In addition, information on morphological descriptions of a given language for a word whose word forms occur as word tokens in a plurality of text corpuses can be obtained, such as by an automatic system. The occurrence of a plurality of word forms for each word token in the text corpuses and the obtained morphological description information can be added together with the initial morphological description to generate a morphological dictionary. Various search systems, retrieval systems, and/or other methods can be used to search word forms.

Exhaustive linguistic models are used to create morphological descriptions for various groups of words, including, for example, for various parts of speech, various groups of words within a part of speech, etc. An environment and devices/systems for creating the morphological models are also provided. Embodiments of the invention may be provided to be implemented in various forms, formats, and also adapted to be stored on a computer-readable medium, executed as a computer program, or as part of a device for generating a morphological dictionary of a natural language.

Figure 1:
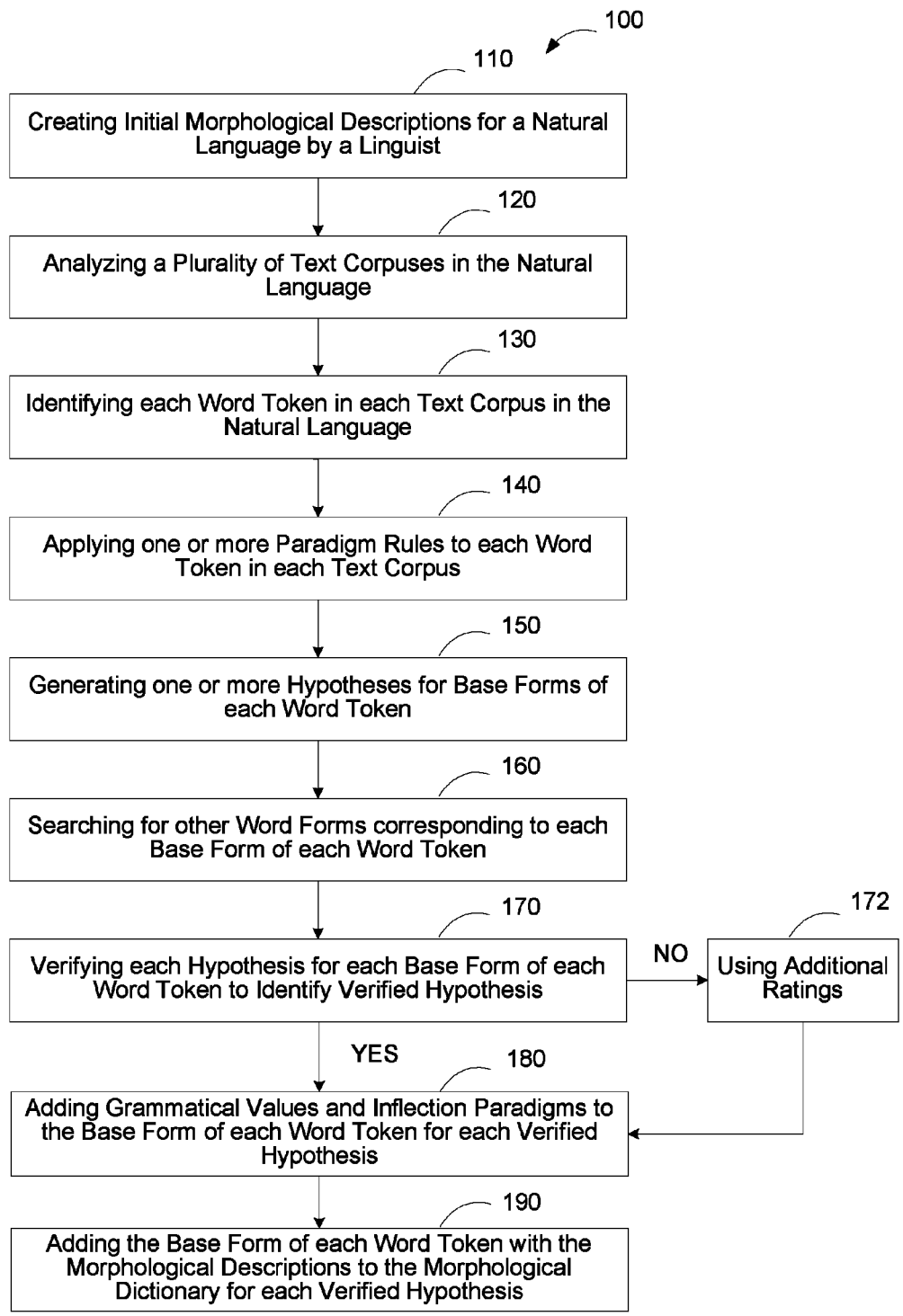
FIG. 1 illustrates a flow diagram of a method for analyzing a text corpus in a natural language and generating a morphological dictionary for the natural language according to one embodiment of the invention.

FIG. 1 illustrates a flow chart of a method 100 for analyzing a text corpus in a natural language and generating a morphological dictionary for the natural language according to one embodiment of the invention. The method 100 may generally include creating an initial morphological description collection for the natural language, such as by a qualified linguist familiar with the natural language, and analyzing a plurality of text corpuses in the natural language in order to generate the morphological dictionary. The text corpus analysis stage can be performed manually or automatically, such as by a computing system having computer readable medium with instructions for causing the computing system to carry out steps for analyzing text corpuses in the natural language.

Figure 2:
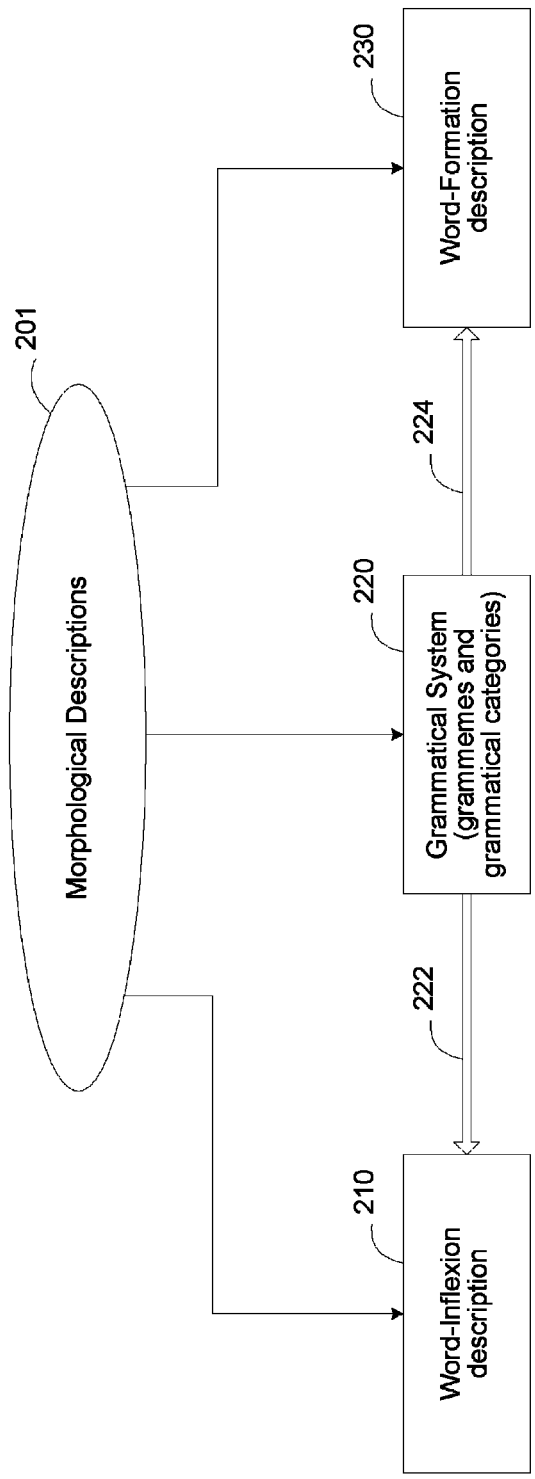
FIG. 2 is a diagram illustrating morphological descriptions according to one exemplary embodiment of the invention.

At step 110, an initial morphological description is obtained. For example, a collection of morphological descriptions having word inflection rules for groups of words in the natural language can be created by a linguist. FIG. 2 is a diagram illustrating morphological descriptions 201 of a natural language according to one embodiment of the invention. In general, the morphological descriptions 201 may include a word-inflexion description 210, a grammatical system 220 of the language, a word-formation description 230, among other things.

The grammatical system 220 of the natural language may include, for example, a set of grammatical categories and grammemes, etc. The grammatical categories can be, for example, "Part of speech", "Case", "Gender", "Number", "Person", "Reflexivity", "Tense", "Aspect", etc. The grammemes may be used as the meanings, explanations, or sub-catagories under each grammatical category. For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc. Sets of grammemes can be combined into grammatical values and can be used in the word-inflexion description 210 and the word-formation description 230, as shown by a link 222 and a link 224 in FIG. 2.

The word-inflexion description 210 may describe how the main word form of a word form may change according to its case, gender, number, tense, etc. and can broadly includes all possible word forms for a given word. The word-formation description 230 may describe which new words may be generated from a given word.

Figure 3:
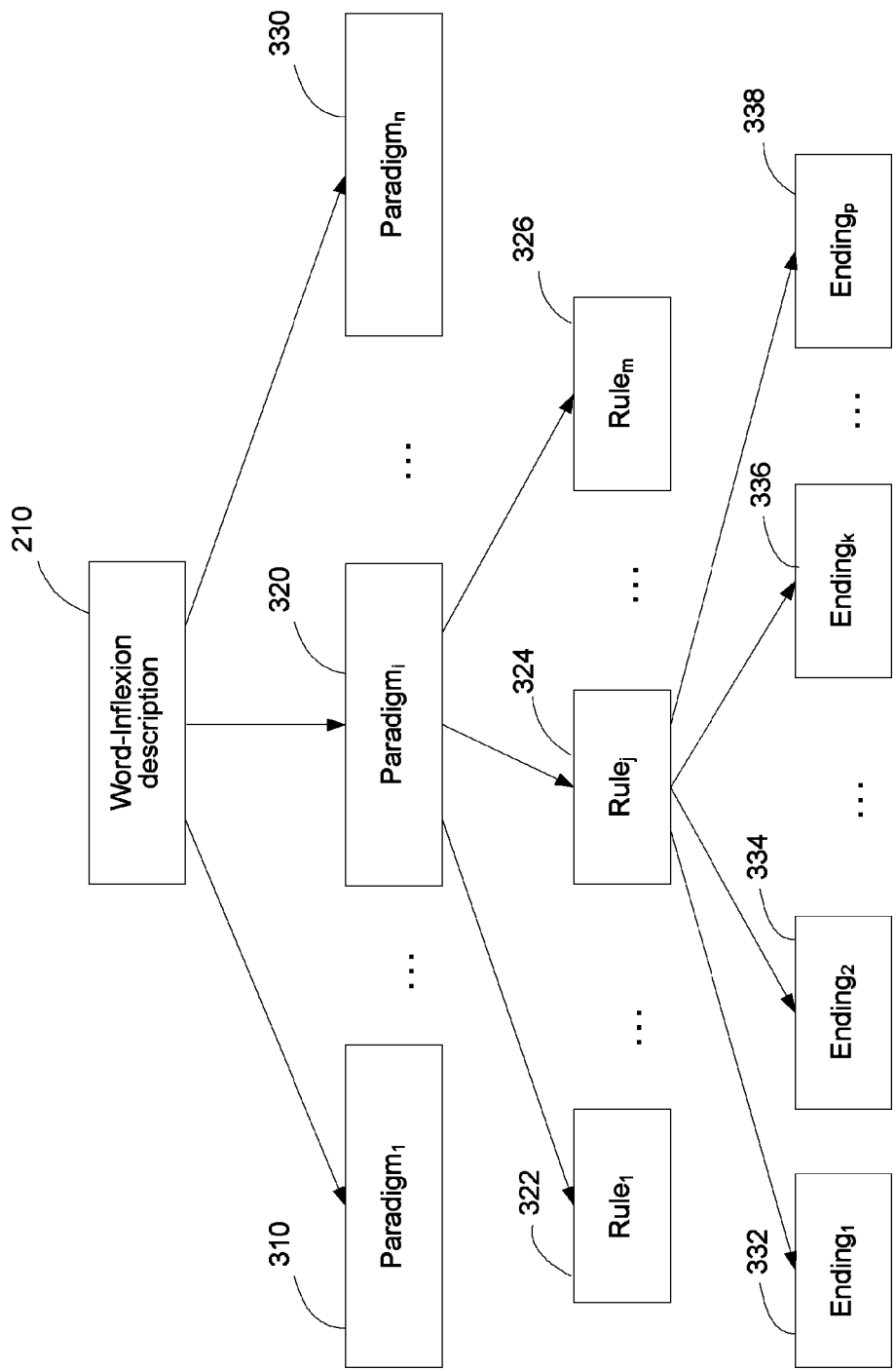
FIG. 3 is a diagram illustrating word-inflexion descriptions according to one exemplary embodiment of the invention.

FIG. 3 is a diagram illustrating an example of the word-inflexion description 210 according to one embodiment of the invention. The word-inflexion description 210 generally includes a set of paradigms 310, 320, 330. Each paradigm is represented in FIG. 3 as paradigm$_1$, paradigm$_2$, ..., paradigm$_i$, ... paradigm$_n$. Each paradigm is characteristic of a certain set of words of a given language.

In one embodiment, a group of words associated with a paradigm can be described in one or more wildcard expressions for a base form of the words plus classifying grammatical values. A base form is a conventional form typically used as a dictionary entry, e.g., an infinitive fro a verb or a singular noun in the Nominative case. For example, for the word forms "went", "going", "goes" in English, "go" is their base form. As another example, for the word form "cultures" in English, "culture" is its base form.

Natural languages usually have grammatical homonymy. For example, for a word token "play", it may be a verb, but it may also be a noun, resulting in at least two different paradigms for the base form "play". Additionally, there may be different variants of the base form for a specific word form. For example, there may be two different base forms for the word token "bit"—"bit" as a noun and "bite" as a verb.

Words with the same word inflection rules may be united into groups. A group of words may be described by one or more wildcard expressions and the classifying grammatical values. For example, for the adverbs "early", "easy", "heavy", etc., the same word inflection rules can be used and can be united under their wildcard expression, "*{s/v/l}y", where the "*" symbol represents any words under this wild card expression.

As another example, for the adjectives "glad", "mad", "red", "sad", etc. the wildcard expression, "*d", may be used. Various rules can be used to generate wildcard expressions. For some words which have very special inflection rules, the wildcard expression may coincide with the base form, in this case the word has special paradigm rules, and such paradigm must be checked at first. For example, an adjective "little" has non-trivial paradigm that can generate the following word forms: "little", "less", "lesser", "least", etc.

Each paradigm 310, 320, 330, etc., may include one or more rules 322, 324, 326, etc. for generating inflected forms based on the base form. The inflected forms have their own endings 332, 334, 336, 338 and include those that have zero or no endings.

In one embodiment, each rule 322, 324, 326 may include one or more direct and/or reverse rules which may add or remove an affix and/or additionally add or remove some endings. For example, the following rules may be used to generate all word forms for a set of English verbs whose base form matches the [*d] wildcard expression (bed, cod, kid, spud, etc.): 1) add the ending -s for present simple third person singular; 2) add the affix -d to the base form and then add endings -ed, -ed, -ing for past simple, ing-participle, and present progressive respectively; 3) the other forms coincide with the base form.

In another embodiment, the inflected forms in each rule of the paradigm 310, 320, 330 may be arranged in a specific order. However, the arranged order of word forms is not limited and can be any arranged order. For example, for a noun, the order can be <Common case, Singular>, <Common case, Plural>, <Possessive case, Singular>, <Possessive case, Plural>.

The same rules can be used to solve an "inverse" (backward) task, e.g., the recognition of a given word form. In this case, the rules are applied in an inverse order. For example, if, according to the rule, an ending can be removed from a word form, and, if the rule requires, an affix can be added to (or removed from, according to the rule) the word form, and, then, if the resulting word matches the wildcard expression in some paradigm, a hypothesis about the paradigm of the base form may be put forward. A hypothesis that the given word form has a particular base form and belongs to a particular paradigm is verified.

Once an initial morphological description is created for the natural language, its morphological dictionary can be generated based on analyzing a sufficiently large corpus of texts. Referring back to FIG. 1, at step 120, a plurality of text corpuses in the natural language is analyzed.

At step 130, each word token in each text corpus of the natural language is identified. A word token may include any lexeme, word form, unit of language, morpheme, etc. Word tokens in a text can be separated by, for example, blank spaces, punctuators, or any other separators. A text corpus can be a large set of texts in a given natural language. Each word token in each text corpus may be readily identified and selected in any available way.

At step 140, one or more paradigm rules are applied to each word token in each text corpus. The one or more paradigm rules applied to each word token may include rules for analyzing each word token, such as rules for adding or removing an ending, adding or removing an affix, and combinations thereof. Searching for possible paradigms for each word token is based on the assumption that a word token may have an ending which may be contained in one or more lists of endings of a paradigm rule and that its base form matches the wildcard expression for this paradigm. For example, if a given word token is "going", "doing", "listening", etc. (in English), an attempt to apply any paradigm rule containing the ending "-ing" to this word token will be made.

There may be many paradigms whose rules can be applied. Some of them may contain not only actions of adding or removing an ending, but also actions of adding or removing an affix. For example, if a given word token is "dying" (in English), after removing the ending "-ing", the affix "-y" must be removed and the affix "-ie" must be added to get the base form "die". If the string of symbols resulting from these actions matches the wildcard expression (for example, the wildcard expression, "*{d/l/t/v}ie", for the base form "die") of the paradigm, this paradigm may be considered as the hypothesis at the next step 150. However, there may be other paradigms whose wildcard expressions are matched in order to produce other potential base forms. All these hypotheses can be checked.

At step 150, one or more hypotheses for base forms of each word token are put forward, and all other word forms according to each hypothesis, i.e. the base form and the paradigm, of each word token are generated and searched for in the text corpus at step 160. Hypotheses for possible paradigms for each base form of the word token are based on the assumption that if a word token can belong to a paradigm, then almost all word forms generated on the base of this paradigm can be found in the text corpus.

Each base form of an identified word token may include one or more corresponding paradigms. Hypotheses for possible paradigms for each base form of the word token are formulated based on an assumption that a word token may have an ending which may be contained in one or more lists of endings of a paradigm rule and that its base form matches the wildcard expression for this paradigm. For example, if a given word token is "going" or "gone", almost all other forms of the verb "to go" are generated and found, including "go", "goes", "gone", "going", "went", etc. If no such word forms are found, word forms "going" and "gone" may belong to a paradigm of an adjective. In addition, "going", may be a noun. But, if a given word token is "go", which coincide with base form of the verb "to go" and base form of the noun "go", in addition, the paradigm of the noun can be checked and the word form "goes", and, if possibly, possessive case forms "go's" and "goes", which are rare, can also be generated.

At step 170, verifying each hypothesis of the one or more hypotheses for each base form of each word token is provided to identify verified hypothesis and obtain information on its morphological descriptions for each word token with verified hypothesis. Verifying each hypothesis may include checking the occurrence in the corpus of all of the generated inflected forms. If all of the inflected forms (possibly with the exception of awkward formations) occur in the corpus, the paradigm is considered to be relevant and the hypothesis is considered to be true. Various search systems, retrieval systems, and/or other methods can be used to search word forms. Each hypothesis for each base form of each word token is verified. If several hypotheses are verified and confirmed which correspond to the same part of speech, these hypotheses with the highest rating scores may be selected.

At step 172, for one or more hypotheses where verification is initially unsuccessful, there is a need to use additional ratings. If none of the hypotheses corresponding to the same part of speech are completely verified, but some of the inflected forms of some of the hypotheses do occur in the corpus, additional ratings may be used for such hypotheses.

The addition ratings can be obtained from checking the base form of each word token against other dictionaries or checker systems. For example, a base form may be checked against a word list of a dictionary (such as a paper dictionary, a digital dictionary converted from a paper dictionary into electronic form, or an otherwise obtained electronic dictionary). As another example, a spell checker may be used to check all the inflected forms generated.

At step 180, for each verified hypothesis, grammatical values and inflection paradigms are added to each base form of each word token. The grammatical values added to the base form of each word token may include information about part of speech for each word token and about its word inflection which may be expressed via grammemes, e.g., gender, singular or plural for nouns, modality for verbs, person, number, and gender for pronouns, among other things. The inflection paradigms added to the base form of each word token may include inflection rules for each word token.

At step 190, for each verified hypothesis, the base form of each word token with the morphological descriptions is added to the morphological dictionary. For example, the base form (such as the lemma of a lexeme, etc.) may be added to the morphological dictionary. In addition, the qualifying grammatical values (obtained from the paradigms of the word token during the generation of the hypotheses for each base form) and the inflection paradigms can be supplied to the morphological dictionary with its corresponding base form of each word token.

The resulting morphological dictionary and morphological model can be widely used in various systems and applications, including, but not limited to, spell checking systems, paradigm retrieval systems (to display all or some inflected forms for a word), spelling suggestion systems for misspelled words, morphological analyzers, morphological synthesizers, syntactic analyzers, syntactic synthesizers, machine translation systems, and combinations thereof, among other things. It is particularly important to generate a morphological dictionary for rare languages for which no morphological dictionaries exist. To obtain an exhaustive morphological dictionary, the initial text corpus may need to be sufficiently large and composed of texts of various styles and subjects.

The method and process flow as described herein can be adapted into one or more computer-readable media or one or more algorithms in order to generate a morphological dictionary of a natural language based on a morphological description of the language and a sufficiently large corpus of texts in that language.

One example of a suitable computing system environment on which the invention may be implemented may be a general purpose computing device in the form of a computer. However, other system environments can also be used. The computing system environment may include, but are not limited to, a processing unit, such as a processor, a system memory, and a system bus that couples various system components to the processing unit. The system bus may be any of several types of bus structures including a memory bus or memory controller, a peripheral bus, and a local bus using any of a variety of bus architectures. The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. which may perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. In one embodiment, various program applications, program modules, etc., such as a morphological dictionary generation application are loaded into the memory and run by the processor. The morphological dictionary generation application may be adapted to perform the steps of the methods as described herein. Morphological dictionaries may be used, for example, in language analysis programs or language synthesis programs for translating sentences from an input language into an output language.

The computing system may generally include a variety of computer readable media. Computer readable media can be any available media that can be accessed by the system and includes both volatile and nonvolatile media, removable and non-removable media. By way of example, and not limitation, computer readable media may comprise computer storage media (storage device) and communication media, such as an input device and an output device.

The computing system may include storage devices and/or various computer storage media, including both volatile and nonvolatile, removable and non-removable storage media implemented in any method or technology for storage of information, such as computer readable instructions, data structures, program modules or other data. The storage device includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the system 2600. For example, the storage device may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Communication media typically embodies computer readable instructions, data structures, program modules or other data in a modulated data signal, such as a carrier wave or other transport mechanism and includes any information delivery media. The modulated data signal may include signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer readable media.

A user may enter commands and information into the computing system through input devices, such as a keyboard, a microphone, a scanner and a pointing device, such as a mouse, trackball or touch pad. Other input devices (not shown) may include a joystick, game pad, satellite dish, scanner, or the like.

These and other input devices are often connected to the processor of the computing system through a user input interface that is coupled to the system bus, but may be connected by other interface and bus structures, such as a parallel port, game port or a universal serial bus (USB). A monitor, a display, or other type of display device is also connected to the system bus via an interface, such as a video interface. In addition to the display, the computing system may also include other peripheral output devices, such as speakers and printers, which may be connected through an output peripheral interface.

A text corpus to be analyzed by the morphological dictionary generation application may be collected from various electronic sources, such as books, articles, internet resources, archives, papers, manuals, glossaries, thesauri, dictionaries, and any other sources, etc. As another example, a text corpus to be analyzed may be received after being recognized from a graphical input (for example, being recognized as PDF, TIF, JPG, BMP, and other files) through optical character recognition (OCR) applications, or after being sent by a fax and then scanned by a scanner, etc., or after being converted from images into a text corpus after optical recognition with the help of optical character recognition (OCR) applications. The text corpuses to be analyzed may be stored on a computer, LAN, or distributed network.

The computing system may operate in a networked environment using logical connections to one or more remote computers. The remote computer may be a personal computer, a hand-held device, a server, a router, a network PC, a peer device or other common network node, and typically includes many or all of the elements described above relative to the system. The network connections can include, for example, a local area network (LAN) or a wide area network (WAN), such as the Internet. Such networking environments are commonplace in offices, enterprise-wide computer networks, intranets, and the Internet. When used in a LAN networking environment, the system is connected to the LAN through a network interface or adapter. When used in a WAN networking environment, the system may additionally include a modem or other means for establishing communications over the WAN, such as the Internet. It will be appreciated that the network connections shown are exemplary and other means of establishing a communications link between the systems and computers may be used.

The morphological dictionary generation application may include a memory or/and a database for storing various intermediate information. The morphological dictionary generation application may include an initial morphological description (such as a morphological dictionary created by a qualified linguist) for a given language and a text corpus analyzer adapted to perform the method and steps as described here. Additionally, the morphological dictionary generation application may also include a user interface for input/output and a database for storing various linguistic descriptions and intermediate information, for example, morphological descriptions, ratings, paradigms, rules, endings, words, etc.

The morphological dictionary generation application may also interface with a program interface, other applications, and/or a user interface to interact with other programs and a user, respectively. For example, the morphological dictionary generation application may receive a text corpus from a speech recognition application after converting an initial input format into a text corpus after speech recognition. As another example, a language sentence may be received from an optical character recognition (OCR) application and converted from an image of the language sentence into a text corpus after optical recognition of the image.

Morphological dictionaries were created for various linguistic families, including Indo-European (Slavic, Germanic, and Romance languages), Finno-Ugric, Turkic, Oriental, and Semitic. Embodiments of the invention may be applied to many languages, including, but not limited to, English, French, German, Italian, Russian, Spanish, Ukrainian, Dutch, Danish, Swedish, Finnish, Portuguese, Slovak, Polish, Czech, Hungarian, Lithuanian, Latvian, Estonian, Greek, Bulgarian, Turkish, Tatar, Hindi, Serbian, Croatian, Romanian, Slovenian, Macedonian, Japanese, Korean, Arabic, Hebrew, and Swahili, among other things.

While the foregoing is directed to embodiments of the present invention, other and further embodiments of the invention may be devised without departing from the basic scope thereof, and the scope thereof is determined by the claims that follow.

The invention claimed is:

1. A computer system to create a morphological electronic dictionary for a natural language, the computer system comprising:
 a processor;
 an electronic memory configured with electronic instructions to cause the computer system to perform steps, the electronic instructions including:
  identify each word token in the text corpus;
  apply paradigm rules to each word token in the text corpus;
  generate one or more hypotheses about a part of speech for base forms of each word token;
  select other word inflected forms corresponding to the base form of each word token;
  verify each hypothesis of the one or more hypotheses for each base form of each word token based on ratings;

add grammatical values and inflection paradigms to each base form of each word token for each verified hypothesis;

obtain information about one or more morphological descriptions for each word token with a verified hypothesis; and add the base form of each word token with the morphological descriptions to the electronic morphological dictionary of the natural language for each verified hypothesis.

2. The computer system of claim 1, the instructions further including: creating an initial morphological description having word inflection rules for groups of words in the natural language.

3. The computer system of claim 1, wherein each of the morphological descriptions comprises one or more word inflection rules.

4. The computer system of claim 1, wherein the morphological descriptions comprise one or more word formation rules.

5. The computer system of claim 1, wherein the morphological descriptions comprise a grammatical system of the natural language.

6. The computer system of claim 5, wherein the grammatical system of the natural language comprises a set of grammatical categories and the grammemes thereof.

7. The computer system of claim 1, further comprising: using additional ratings for one or more hypotheses where verification is initially unsuccessful.

8. The computer system of claim 7, wherein the addition additional ratings are obtained from checking the base form of each word token against a word list of a dictionary.

9. The computer system of claim 7, wherein the addition additional ratings are obtained from checking the base form of each word token with a spelling checker component.

10. The computer system of claim 1, wherein the one or more paradigm rules applied to each word token comprise rules for changing each word token, the rules selected from the group consisting of: adding an affix, removing an affix, adding an ending, removing an ending, and combinations thereof.

11. The computer system of claim 1, wherein the grammatical values added to the base form of each word token comprise information about a part of speech for each word token.

12. The computer system of claim 1, wherein the inflection paradigms added to the base form of each word token comprise inflection rules for each word token.

13. The computer system of claim 1, wherein the natural language comprises a natural language selected from the group consisting of: English, French, German, Italian, Russian, Spanish, Ukrainian, Dutch, Danish, Swedish, Finnish, Portuguese, Slovak, Polish, Czech, Hungarian, Lithuanian, Latvian, Estonian, Greek, Bulgarian, Turkish, Tatar, Hindi, Serbian, Croatian, Romanian, Slovenian, Macedonian, Japanese, Korean, Arabic, Hebrew, and Swahili.

14. A computer system to generate a morphological electronic dictionary for a natural language, the computer system comprising:

a processor;

an electronic memory configured with electronic instructions to cause the computer system to perform steps, the electronic instructions including:

create an initial morphological description having word inflection rules for groups of words in the natural language;

analyze by the computer system a plurality of text corpuses in the natural language, including:

identifying each word token in each text corpus of the natural language;

applying one or more paradigm rules to each word token in each text corpus;

generating one or more hypotheses about parts of speech for base forms of each word token;

searching for other word inflected forms corresponding to the base form of each word token;

verifying each hypothesis of the one or more hypotheses for each base form of each word token based on ratings to identify verified hypotheses;

adding grammatical values and inflection paradigms to each base form of each word token for each verified hypothesis; and obtaining information about one or more morphological descriptions for each word token with a verified hypothesis; and add the base form of each word token with the morphological descriptions to the morphological electronic dictionary for each verified hypothesis.

15. The computer system of claim 14, wherein the morphological descriptions comprise one or more word inflection rules.

16. The computer system of claim 14, wherein the morphological descriptions comprise one or more word formation rules.

17. The computer system of claim 14, wherein the morphological descriptions comprise a grammatical system of the natural language.

18. The computer system of claim 14, wherein the natural language comprises a natural language selected from the group consisting of: English, French, German, Italian, Russian, Spanish, Ukrainian, Dutch, Danish, Swedish, Finnish, Portuguese, Slovak, Polish, Czech, Hungarian, Lithuanian, Latvian, Estonian, Greek, Bulgarian, Turkish, Tatar, Hindi, Serbian, Croatian, Romanian, Slovenian, Macedonian, Japanese, Korean, Arabic, Hebrew, and Swahili.

* * * * *